H. SOUDEN & W. S. LEAHY.
RAIL JOINT.
APPLICATION FILED SEPT. 21, 1911.
1,012,023.
Patented Dec. 19, 1911.
2 SHEETS—SHEET 2.
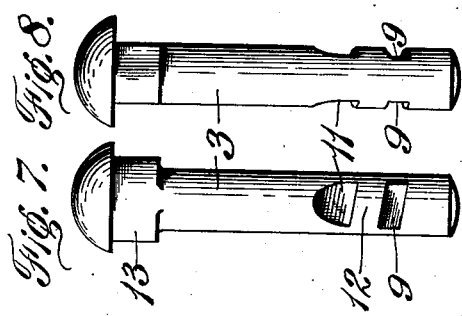
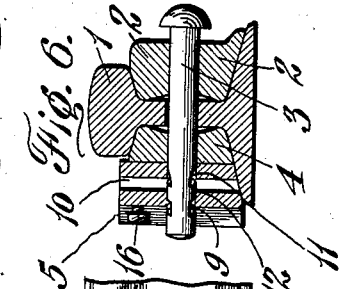
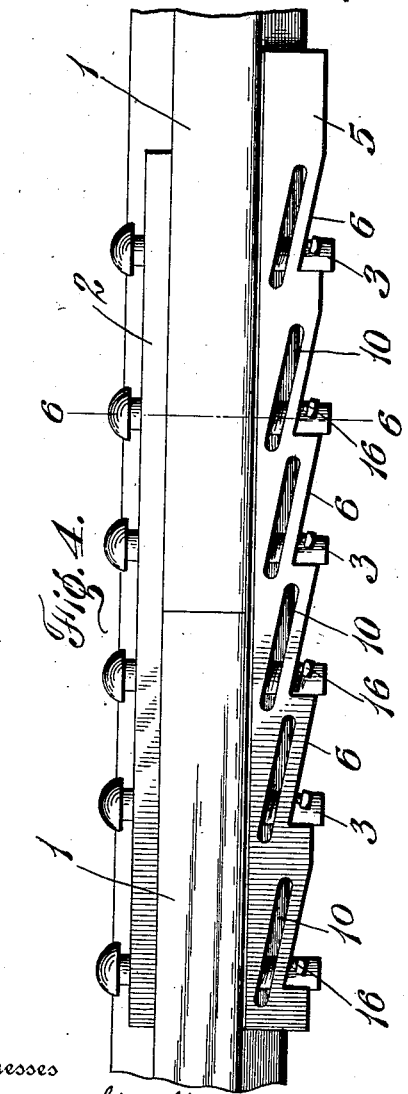
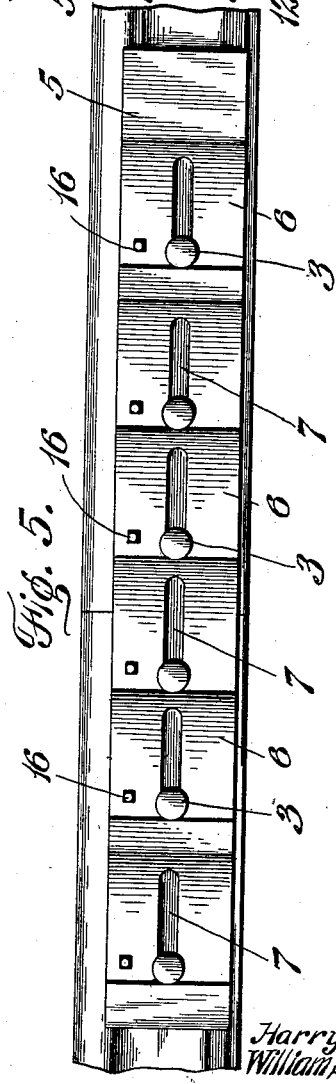
Witnesses
Chas. W. Stauffiger
F. E. Ernst
Inventors
Harry Souden,
William S. Leahy,
By
Attorney

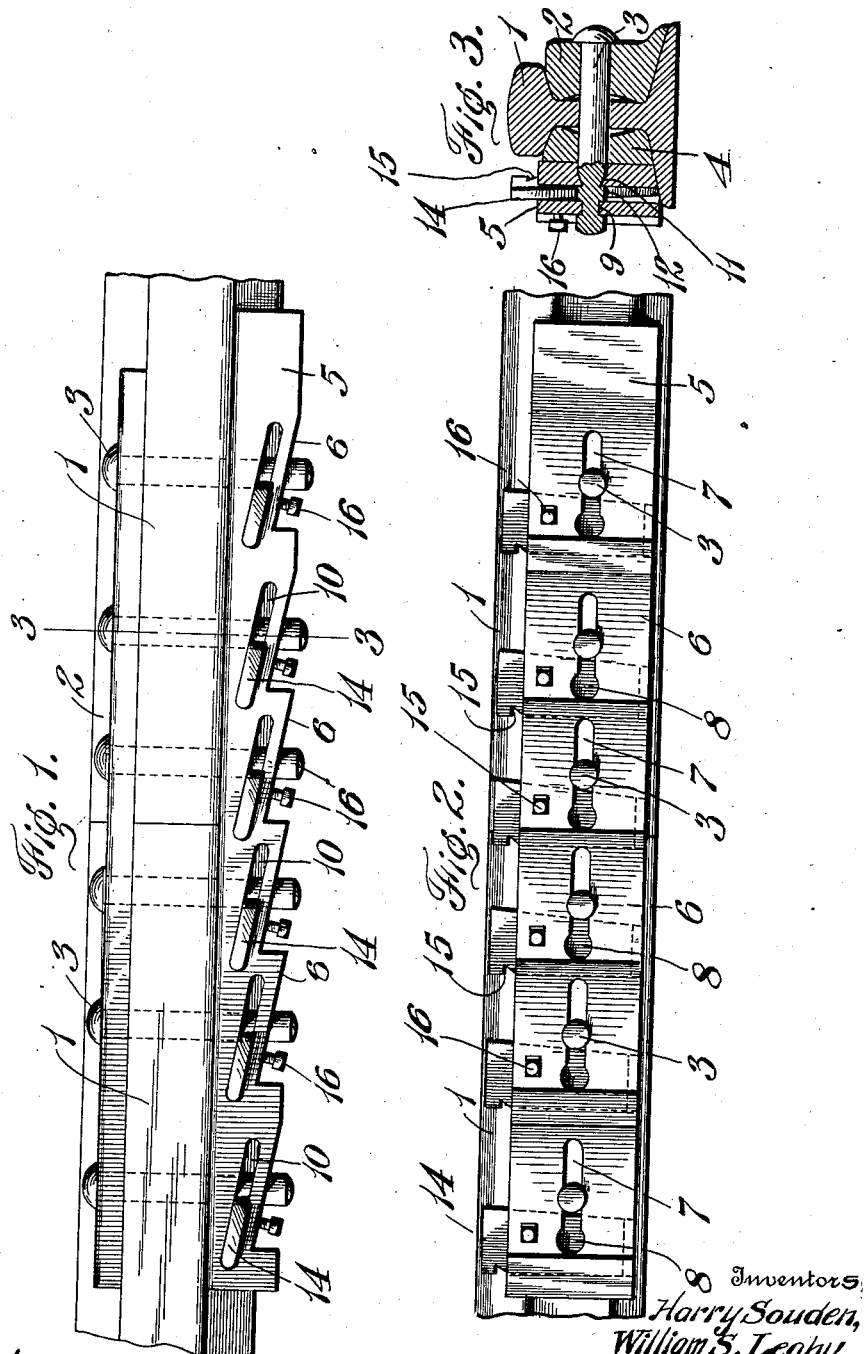

UNITED STATES PATENT OFFICE.

HARRY SOUDEN AND WILLIAM S. LEAHY, OF LEBANON, PENNSYLVANIA.

RAIL-JOINT.

1,012,023.  Specification of Letters Patent.  Patented Dec. 19, 1911.

Application filed September 21, 1911.  Serial No. 650,509.

*To all whom it may concern:*

Be it known that we, HARRY SOUDEN and WILLIAM S. LEAHY, citizens of the United States of America, residing at Lebanon, in the county of Lebanon and State of Pennsylvania, have invented certain new and useful Improvements in Rail-Joints, of which the following is a specification, reference being had therein to the accompanying drawings.

This invention relates to rail joints of the class in which the securing bolts are each locked in place by a single wedge plate, and its object is to provide a construction which is such as to prevent lateral movement and binding of the bolts in operating the plate to lock the bolts, and to provide means for moving and locking the plate.

To this end the invention consists in the matters hereinafter set forth and more particularly pointed out in the claims reference being had to the accompanying drawings in which, Figure 1 is a plan view of a rail joint embodying the invention; Fig. 2, a side elevation of the same; Fig. 3, a transverse section on the line 3—3 of Fig. 1; Fig. 4 is a plan view of the rail joint showing the same in unlocked position with its wedge plate and bolts in position to be locked; Fig. 5 is a side elevation of Fig. 4; Fig. 6 is a transverse section on the line 6—6 of Fig. 4; Fig. 7 is a side elevation of one of the bolts; and Fig. 8 is a similar view taken at right angles to that of Fig. 7.

As shown in the drawings, 1, 1 represent the abutting ends of railway rails and 2 a fish plate of the common form and construction provided with holes to receive a series of bolts 3 for securing the fish plate to one side of the rails across the joint. Engaging the opposite side of the rails is a second fish plate 4 of lesser thickness, the bolts passing through holes in the rails and corresponding holes in the fish plates, and engaging the outer side of this thin fish plate is a wedge plate 5 formed with a series of notches in its outer face, these notches forming a series of plane surfaces 6 each inclined to the inner face of the plate. A series of key-hole slots 7 are provided in the plate, one in each of the inclined surfaces and extending through the plate to receive one of the bolts 3. The round end opening 8 of each of the slots is of sufficient diameter to permit the bolts to pass therethrough and a slot extending longitudinally from said opening is of a width to fit into grooves 9 cut in the sides of each bolt, shoulders being formed by the grooves to engage the inclined or wedge surfaces 6. The wedge plate is also formed with a series of vertical slots 10 extending therethrough, one opposite each of the inclined surfaces 6 and extending parallel with said surface. A cut away portion or notch 11 in each bolt forms a rib 12 between it and the notch 9 to engage the slots 10 when the bolts are inserted through the openings 8 and the plate then moved longitudinally to engage the bolts with the laterally extending portions of the key slots. Adjacent to its head each bolt is formed with an enlarged shank portion 13 which is of greater diameter than the diameter of the bolt in one direction and is of the same diameter in the opposite direction. The fish plate 2 is formed with laterally enlarged openings to receive the shank portions of the bolts and prevent the same from turning. When the bolts are inserted they are thus held with their slots or grooves in position to be engaged by the wedge plate.

To force the wedge plate longitudinally and thus set up the bolts to firmly hold the parts, a wedge 14 is provided for each of the slots 10, which wedges are adapted to be inserted in these slots with their lower ends between one end of the slots and the bolts, after the bolts have been inserted through the wedge plate and said plate moved slightly to engage the grooves in the bolts with the key slots in the plate. Each wedge 14 is formed tapering in the direction of its length and when the narrow lower ends of these wedges are inserted between the ends of their slots 10 and the bolts and then driven in, they will force the wedge plate longitudinally and at the same time prevent the bolts from being bent and from binding in the key-slots by reason of their frictional engagement with the wedge plate. If the wedge plate should be driven longitudinally with a sledge to tighten the bolts, they would be bent in the direction of the movement of the plate because of the sharp inclination of the surfaces 6, but by providing the slots 10 and a wedge in each slot to engage the bolt passing across the slot, each bolt is backed up by its wedge and the several wedges acting upon the wedge plate, will move it evenly and firmly into contact with the bolts and tighten the same more effectually and with less strain upon the parts than as though the wedge plate be driven endwise. The ribs 12 on the bolts which engage the slots 10 give the bolts a double hold upon the wedge plate so that the bolts cannot be stripped by forcing the wedges to place. Each wedge 14 is provided with a notch 15 in one side for the engagement of a tool by means of which the wedge may be extracted, and a set screw 16 is provided for each wedge passing through the wedge plate into engagement with the outer side of the wedge when driven to place to hold the wedges from accidental displacement.

Having thus fully described our invention what we claim is:

1. In a rail joint the combination with adjacent rail ends and a fish plate at one side of said rails, of bolts extending through said fish plate and rails and provided with grooves forming shoulders, a wedge plate formed with wedge surfaces to engage the shoulders on the bolts and with key-hole slots to receive the bolts, and means for moving the wedge plate longitudinally adapted to engage the bolts at the sides thereof opposite that toward which the plate is moved, to prevent the bolts from being moved laterally by the endwise movement of the plate.

2. In a rail joint, the combination with adjacent rail ends and a fish plate at one side of said rails, of a wedge plate formed with horizontal longitudinally extending slots and wedge portions, bolts extending through the fish plate, rails and slots in the wedge plate and formed with shoulders to engage the wedge portions, and wedges engaging the wedge plate at one edge and the bolts at their opposite edge to move the plate longitudinally and prevent the lateral movement of each of the bolts.

3. In a rail joint, the combination with adjacent rail ends and a fish plate, of a wedge plate formed with horizontal longitudinally extending key-hole slots and vertically disposed slots extending obliquely to the plane of the inner surface of the plate and cutting through the key-hole slots, bolts extending through the fish plate, rails and key slots in the wedge plate and formed with ribs to engage the vertical slots, and means within the vertical slots engaging the bolts to move the wedge plate longitudinally.

4. In a rail joint, the combination with adjacent rail ends and a fish plate, of a wedge plate formed with longitudinally extending slots and horizontal key-hole slots cutting the vertical slots, said plate being also formed with a series of outer wedge surfaces, bolts passing through the fish plate, rails and key-hole slots and formed with shoulders to engage the wedge surface, and wedges in the vertical slots between one end of said slots and one side of the bolts to move the plate longitudinally.

5. In a rail joint, the combination with adjacent rail ends and a fish plate, of a wedge plate having a plane inner surface and a series of notches in its outer side forming a series of wedge surfaces, said wedge plate being formed with vertical slots opposite the wedge surfaces and extending parallel therewith, and also formed with horizontal key-hole slots cutting the vertical slots, bolts extending through the fish plate, the rails and the key-hole slots in the wedge plate and provided with grooves forming shoulders to engage the wedge surfaces and ribs to engage the vertical slots, wedges in the vertical slots between one end thereof and the bolts to engage the bolts and move the wedge plate longitudinally, and means carried by the wedge plate for securing the wedges in operative position.

In testimony whereof we affix our signatures in presence of two witnesses.

HARRY SOUDEN.
WILLIAM S. LEAHY.

Witnesses:
HARVEY S. PEFFLEY,
ALLEN E. DILLMAN.

Copies of this patent may be obtained for five cents each, by addressing the "Commissioner of Patents, Washington, D. C."